United States Patent
Hofmann et al.

(10) Patent No.: US 12,533,090 B2
(45) Date of Patent: Jan. 27, 2026

(54) CT IMAGING DEPENDING ON AN INTRINSIC RESPIRATORY SURROGATE OF A PATIENT

(71) Applicant: Siemens Healthineers AG, Forchheim (DE)

(72) Inventors: Christian Hofmann, Erlangen (DE); Matthias Baer-Beck, Spardorf (DE)

(73) Assignee: Siemens Healthineers AG, Forchheim (DE)

( * ) Notice: Subject to any disclaimer, the term of this patent is extended or adjusted under 35 U.S.C. 154(b) by 486 days.

(21) Appl. No.: 18/057,244

(22) Filed: Nov. 21, 2022

(65) Prior Publication Data
US 2023/0157650 A1 May 25, 2023

(30) Foreign Application Priority Data
Nov. 25, 2021 (EP) .................................. 21210497

(51) Int. Cl.
*A61B 6/03* (2006.01)
*A61B 6/00* (2024.01)

(52) U.S. Cl.
CPC .............. *A61B 6/032* (2013.01); *A61B 6/486* (2013.01); *A61B 6/5205* (2013.01);
(Continued)

(58) Field of Classification Search
CPC ....... A61B 6/5264; A61B 5/1114; A61B 6/06; A61B 6/032; A61B 6/486; A61B 6/5205;
(Continued)

(56) References Cited

U.S. PATENT DOCUMENTS

| 2008/0031404 A1* | 2/2008 | Khamene | A61N 5/1049 378/6 |
| 2009/0060121 A1* | 3/2009 | Ziegler | G01T 1/1648 378/8 |

(Continued)

FOREIGN PATENT DOCUMENTS

| CN | 102245098 A | 11/2011 |
| CN | 107095688 A | 8/2017 |

(Continued)

OTHER PUBLICATIONS

B. Fuerst et al., "Patient-Specific Biomechanical Model for the Prediction of Lung Motion From 4-D CT Images," in IEEE Transactions on Medical Imaging, vol. 34, No. 2, pp. 599-607, Feb. 2015 (Year: 2015).*

(Continued)

*Primary Examiner* — Sumati Lefkowitz
*Assistant Examiner* — Aaron Joseph Sorrin
(74) *Attorney, Agent, or Firm* — Harness, Dickey & Pierce, P.L.C.

(57) ABSTRACT

A method for performing a CT imaging process based on an individual respiration behaviour of a patient, comprises: recording a respiratory movement of the patient by monitoring an intrinsic respiratory surrogate. In the context of recording the intrinsic respiratory surrogate, CT raw data are acquired from an examination volume of the patient, and 3D-CT images of subsequent stacks of the examination volume at different z-positions are reconstructed. An automatic organ segmentation is performed based on the reconstructed 3D-CT images of the subsequent stacks, wherein at least a portion of the examination volume is segmented. Furthermore, a respiratory movement of at least the portion of the examination volume is detected and determined as the intrinsic respiratory surrogate. The CT imaging process is (Continued)

then adapted based on the intrinsic respiratory surrogate of the patient.

21 Claims, 5 Drawing Sheets

(52) U.S. Cl.
CPC .......... *A61B 6/5223* (2013.01); *A61B 6/5288* (2013.01); *G06T 2211/428* (2013.01)

(58) Field of Classification Search
CPC ....... A61B 6/5223; A61B 6/5288; A61B 6/52; G06T 11/008; G06T 11/005; G06T 2207/10076; G06T 7/20; G06T 2211/428; A61N 5/1067; A61N 5/1037; A61N 2005/1072
See application file for complete search history.

(56) References Cited

U.S. PATENT DOCUMENTS

| | | |
|---|---|---|
| 2011/0243387 A1 | 10/2011 | Brown |
| 2012/0051515 A1* | 3/2012 | Brown ................. A61N 5/1049 378/65 |
| 2013/0172730 A1* | 7/2013 | Cohen .................. A61B 6/5235 600/424 |
| 2016/0113614 A1* | 4/2016 | Cetingul ................. G06T 15/08 382/131 |
| 2017/0091929 A1* | 3/2017 | Hofmann ............... A61B 6/486 |
| 2017/0238895 A1 | 8/2017 | Hofmann |
| 2017/0258360 A1* | 9/2017 | Kartäusch ............... A61B 5/08 |
| 2018/0031665 A1 | 2/2018 | Zeller |
| 2020/0238102 A1 | 7/2020 | Lamb et al. |

FOREIGN PATENT DOCUMENTS

| | | |
|---|---|---|
| CN | 113018707 A | 6/2021 |
| DE | 102011079496 A1 | 1/2013 |

OTHER PUBLICATIONS

Yang, Dong et al. "Automatic Liver Segmentation Using an Adversarial Image-to-Image Network", Medical Image Computing and Computer-Assisted Intervention, 2017, arXiv:1707.08037 [cs.CV], DOI: 10.1007/978-3-319-66179-7_58; 2017.

Cheukkai, Hui et al: "Internal respiratory surrogate in multislice 4D CT using a combination of Fourier transform and anatomical features", Medical Physics, AIP, Melville, NY, US, vol. 42, No. 7, Jul. 1, 2015 (Jul. 1, 2015), pp. 4338-4348, XP012198529.

* cited by examiner

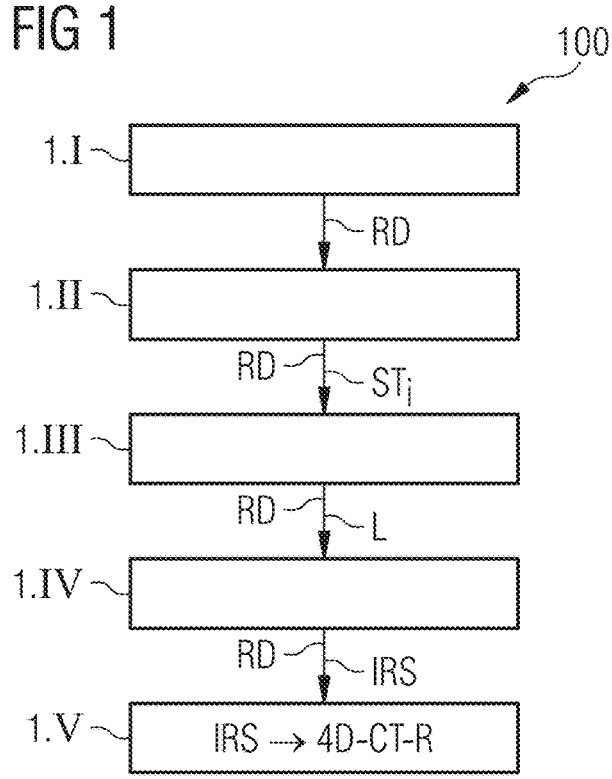
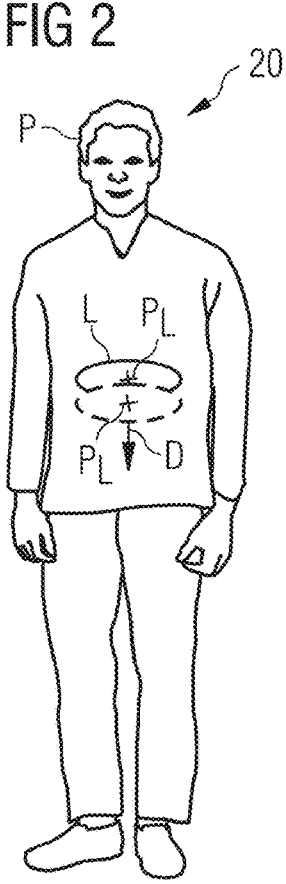

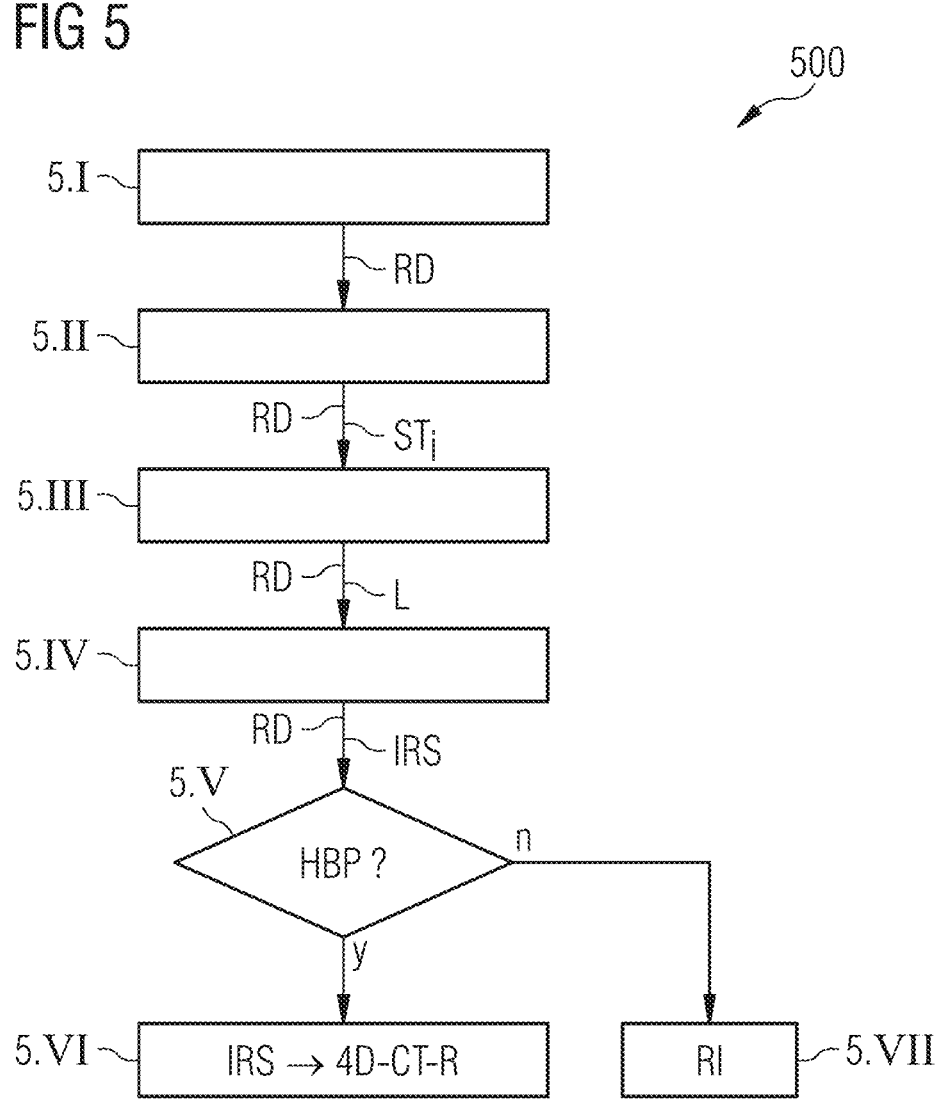

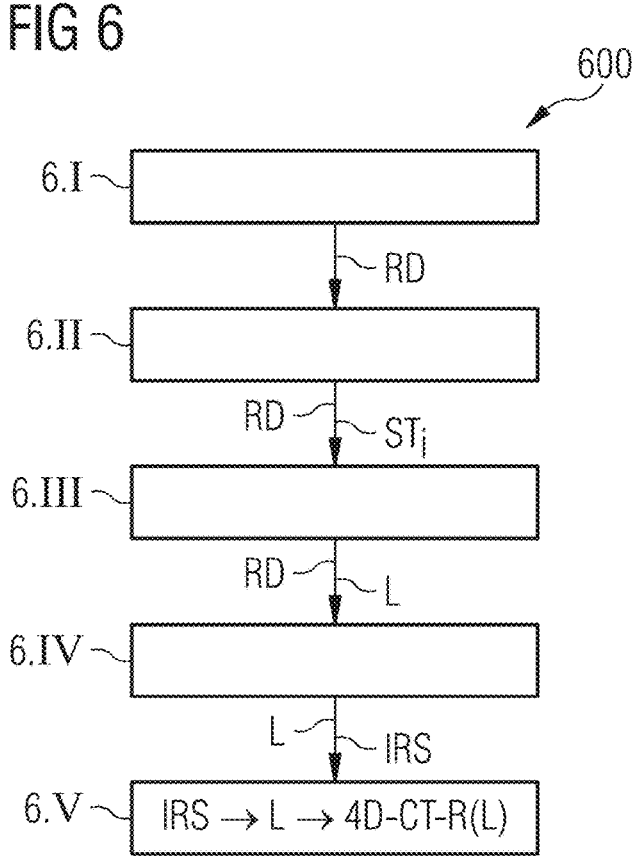
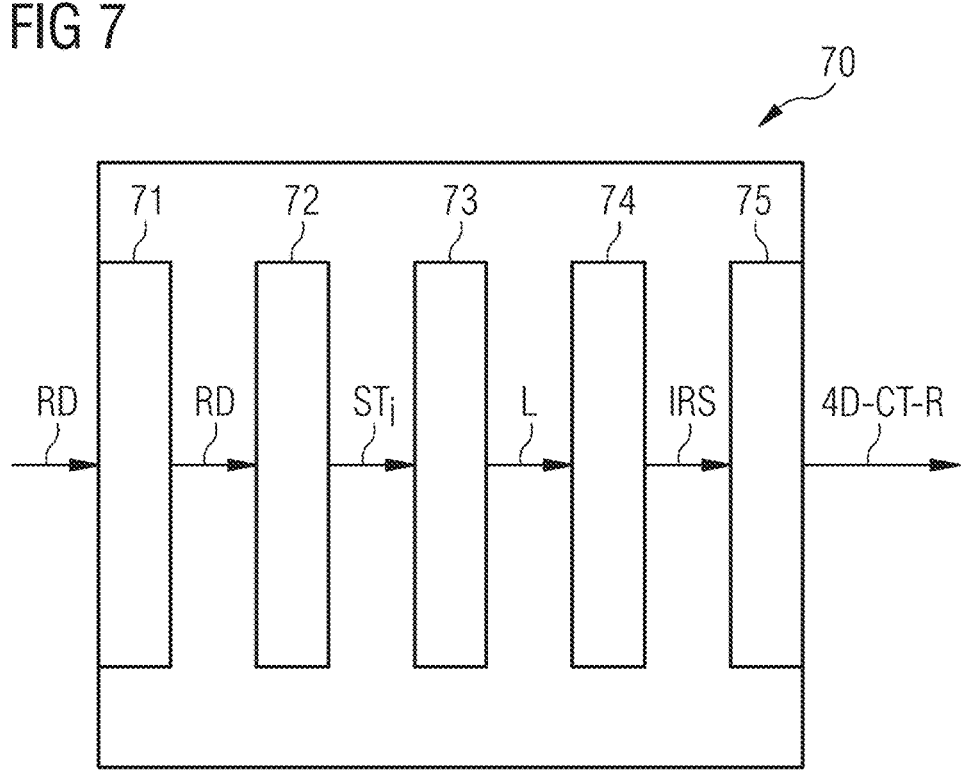

CT IMAGING DEPENDING ON AN INTRINSIC RESPIRATORY SURROGATE OF A PATIENT

CROSS-REFERENCE TO RELATED APPLICATION(S)

The present application claims priority under 35 U.S.C. § 119 to European Patent Application No. 21210497.0, filed Nov. 25, 2021, the entire contents of which are incorporated herein by reference.

FIELD

One or more example embodiments of the present invention relate to a method for performing a CT imaging process depending on an individual respiration behaviour of a patient. One or more example embodiments of the present invention also relate to an adaption device. Further, one or more example embodiments of the present invention relate to a CT system.

BACKGROUND

In radiation therapy planning CT images (CT is an abbreviation for computed tomography) are used to compute and optimize dose distribution maps and radiation therapy plans. Depending on the location of a tumor, a respiratory phase correlated reconstruction may be needed if the location of the tumor is prone to motion to avoid radiation damage to healthy tissue and organs at risk.

By using the information about the respiratory motion of the patient, a time-resolved reconstruction which is correlated to the breathing motion of the patient can be done and thereby the radiation therapy plans can be optimized for the breathing induced motion of the targeted tumor, e.g. a lung tumor.

To be able to do a high quality phase correlated reconstruction it is crucial to have a precise measurement of the breathing motion of a patient, a so-called respiratory surrogate.

Currently, the information about the breathing motion, i.e. the so-called respiratory surrogate, is gathered by an external device. Such an external device can be either an optical system that tracks the breathing motion by a camera system or a tension based system where an elastic belt is installed around the patient's thorax and which measures directly the breathing motion by a built-in tension sensor.

Respiratory information collected by a so-called "respiratory surrogate" have been used until now only in dedicated 4D (4D=4 dimensional) respiratory scan modes and protocols of CT scan systems. Here, the respiratory surrogate has been used to determine the respiratory phase of a patient either during the scan in order to enable phase correlated scanning or after the scan in order to perform a phase correlated reconstruction of image data based on the scanned raw data.

In standard and non-respiratory scans and reconstructions, the respiratory surrogate is not recorded at all. The reason for this is that up to now the respiratory surrogate has been recorded by an external measurement system which is quite complicated and complex to attach to the patient.

Breathing commands are contained in almost any CT protocol. Typically, those commands are given right before or during the scan in order to give an advice to the patient how to control his breathing in order to avoid artifacts in the reconstructed images due to breathing movements. Currently, the commands are typically pre-recorded speech commands which can be recorded and stored by the clinical users of the CT scan units. Typically, every clinical imaging task, for example cardiac, dual energy, standard contrast and non-contrast exams, have their dedicated commands which are pre-recorded and stored in specific protocols by the clinical users according to their needs and clinical practice. The drawback of those pre-recorded commands is that they do not take into account the breathing properties of the current patient and that they cannot adapt to the current breathing status of the patient. For example, there is no way to detect whether the patient is following the commands or not which can in the worst case yield to non-diagnostic images and the need for a re-scan.

SUMMARY

A problem identified by the inventors, and underlying one or more example embodiments of the present invention, is to improve a CT scan process, which is influenced by a respiratory movement of a patient.

At least this problem is solved by a method for performing a CT imaging process depending on an individual respiration behaviour of a patient, an adaption device and a CT system, according to one or more example embodiments of the present invention.

According to the method for performing a CT imaging process depending on an individual respiration behaviour of a patient a respiratory movement of a patient is recorded by monitoring an intrinsic respiratory surrogate. An intrinsic respiratory surrogate is defined in contrast to an extrinsic surrogate as a surrogate which is not created by additional measurements, as for example using a marker or an external imaging device. The intrinsic respiratory surrogate is directly determined based on CT imaging data which are based on CT raw data which can be also used for reconstructing 4D-CT image data. 4D-CT image data comprise a sequence of subsequently recorded 3D-CT images.

According to the method, according to one or more example embodiments of the present invention, CT raw data are acquired from an examination volume of a patient. Then, 3D-CT images of subsequent stacks of the examination volume at different z-positions are reconstructed preferably in real time and timely parallel to the acquisition of raw data in temporal increments (3D-CT image=three dimensional computer tomography image). A z-position is the value of the z-coordinate inside a CT system, wherein the z-coordinate is the coordinate value of the z-axis. The z-axis is the system axis and/or rotation axis of the rotating part of the CT system. One single stack can include a single layer, i.e. a layer with the thickness of one single voxel. One single stack can also include a plurality of layers. Since the 3D-CT images are reconstructed in real time and timely parallel in temporal increments to the acquisition of raw data, the reconstructed images are achieved as quasi fixed images, wherein subsequent images are assigned to subsequent different phases of breathing movement of the patient.

The real time reconstruction can be achieved, since the duration of a respiratory cycle is typically in the range of 3 s to 12 s (s is the abbreviation for seconds), which is at least an order of magnitude longer than the typical time for an acquisition and reconstruction of a minimum amount of raw data needed to reconstruct 3D-CT images, i.e. the time to acquire raw data in a range of 180° plus the fan angle of the X-ray beam.

Further, an automatic segmentation, preferably an organ segmentation, is performed based on the 3D-CT images, wherein at least one portion, preferably an organ, of the examination volume is segmented.

One can also segment something other than an organ in order to calculate the respiratory surrogate. Segmentation means the generation of content-related regions by combining neighboring pixels or voxels according to a certain criterion of homogeneity. For example, different parts of a body, for example organs are demarcated from each other. Hence, the respiratory surrogate can be determined based a segmented organ. However, one could also imagine, for example, that the abdominal wall or the entire chest is segmented in order to draw conclusions about the breathing behavior of a patient. The level of detail of the reconstruction must be appropriate to the task. The reconstruction must be detailed enough that the relevant structures are still recognizable.

As mentioned-above, the segmentation is implemented as an auto-segmentation, preferably based on AI-algorithms (AI is an acronym for Artificial Intelligence). Such an auto-segmentation is described in Yang D, Daguang X, Kevin Zhou S, Georgescu B, Chen M, Grbic S, Metaxas D, Comaniciu D, "Automatic Liver Segmentation Using an Adversarial Image-to-Image Network", Medical Image Computing and Computer-Assisted intervention—MICCAI 2017: 20th International Conference, Quebec City, QC, Canada, September 11-13, Proceedings.

By performing a segmentation, the basis for the detection of a respiratory movement has been laid. That is because with the information about which organ is segmented and in which direction the organ moves, by comparing the temporal samples of the auto-segmentation results, respiratory parameters like moving direction of the organ, displacement and especially whether or not a complete respiratory cycle has been acquired, can be determined. The method will be more robust with larger detector z-coverage, i.e. a stack with a higher number of layers, because the larger the z-coverage of one z-stack (the z direction is the stacking direction of the z-stack) the easier will be the automatic segmentation, because a more extended image section can be used for detecting the segments.

Then the respiratory movement of the segmented portion, preferably an organ or a part of an organ, is detected and determined as the intrinsic respiratory surrogate. In detail, the segmentation enables to determine a time dependent position or extension of the segmented portion. Based on the time dependent position or extension, a breathing phase for the time interval of acquisition of raw data for each stack can be determined.

Hence, a time dependence of breathing phase and acquired raw data is achieved, which is the function of a respiratory surrogate. All these steps of a reconstruction of quasi-fixed images, the automatic segmentation and the determination of the intrinsic respiratory surrogate are performed in real time such that the result can be used for adapting the CT imaging process based on the intrinsic respiratory surrogate of the patient. For example, as an adaption, an x-ray on/off control of a respiratory correlated scan mode can be realized based on the determined intrinsic respiratory surrogate. As later described, also a phase-correlated reconstruction for generating 4D-CT images of organs that are prone to respiratory motion can be achieved in conformity with determined intrinsic respiratory surrogate. Advantageously, an extrinsic, i.e. a conventional respiratory surrogate, can be omitted, which simplifies the imaging process. In contrast to conventional methods, the method according to one or more example embodiments of the present invention does not need an external measurement system, but can deduce the respiratory surrogate simply from the measured CT raw data and therefore can be fully integrated into a conventional CT scan workflow. Furthermore, a function of a real-time adaption of the CT imaging is achieved which provides the advantage of a flexible and real-time reaction during an CT imaging process. For example, in case the CT imaging process is used for monitoring an X-ray therapy of a tumor, it is necessary to react in real-time when healthy tissue of the patient is inadvertently penetrated by the X-rays for preventing an unnecessary health burden for the patient.

The adaption device according to one or more example embodiments of the present invention comprises an acquisition unit for acquiring CT raw data from an examination volume of a patient. Further, the adaption device also includes a reconstruction unit for reconstructing 3D-CT images of subsequent stacks of the examination volume at different z-positions, preferably in real time and timely parallel to the acquisition of raw data in temporal increments. The adaption device also comprises a segmentation unit for performing an automatic segmentation of at least one portion of the examination volume, preferably an organ segmentation, based on the 3D-CT images of the subsequently reconstructed stacks. Part of the adaption device is also a surrogate determination unit for determining the respiratory movement of the segmented portion as the intrinsic respiratory surrogate. The adaption device also comprises an adaption unit for adapting the CT imaging process based on the intrinsic respiratory surrogate of the patient. The adaption unit can comprise a reconstruction unit for a reconstruction of image data in conformity with a respiratory movement of the patient. The adaption unit can also comprise a control function for controlling an x-ray source in a respiratory correlated scan mode. The adaption device shares the advantages of the method according to one or more example embodiments of the present invention.

The CT system according to one or more example embodiments of the present invention comprises a scan unit for carrying out a CT imaging from a patient and an adaption device according to one or more example embodiments of the present invention for adapting the CT imaging process of the scan unit to a recorded respiratory movement of the patient. The CT system shares the advantages of the method according to one or more example embodiments of the present invention.

The essential components of the adaption device according to one or more example embodiments of the present invention can for the most part be designed in the form of software components. This applies in particular to the reconstruction unit, the segmentation unit, the surrogate determination unit and the adaption unit of the adaption device but also parts of the input interfaces. In principle, however, some of these components can also be implemented in the form of software-supported hardware, for example FPGAs or the like, especially when it comes to particularly fast calculations, or be implemented using a computer processor. Likewise, the required interfaces, for example if it is only a matter of transferring data from other software components, can be designed as software interfaces. However, they can also be designed as hardware-based interfaces that are controlled by suitable software. Furthermore, some parts of the above-mentioned components may be distributed and stored in a local or regional or global network or a combination of a network and software, in particular a cloud system.

A largely software-based implementation has the advantage that CT systems that have already been used, can easily be retrofitted by a software update in order to work in the manner according to one or more example embodiments of the present invention. In this respect, the object is also achieved by a corresponding computer program product with a computer program that can be loaded directly into a memory device of for example a control device of a CT system, with program sections, in order to carry out all steps of the method according to one or more example embodiments of the present invention if the program is executed in the CT system, in particular the control device. In addition to the computer program, such a computer program product may contain additional components such as a documentation and/or additional components, including hardware components such as Hardware keys (dongles etc.) for using the software.

For transport to the CT system and/or for storage on or in the CT system, a computer-readable medium, for example a memory stick, a hard disk or some other transportable or permanently installed data carrier is used on which the program sections of the computer program that can be read in and executed by a computer unit of the medical imaging system are stored. The computer unit can comprise for example, one or more cooperating microprocessors or the like used for this purpose.

The dependent claims and the following description each contain particularly advantageous embodiments and developments of the present invention. In particular, the claims of one claim category can also be further developed analogously to the dependent claims of another claim category. In addition, within the scope of the present invention, the various features of different exemplary embodiments and claims can also be combined to form new exemplary embodiments.

In a variant of the method according to one or more example embodiments of the present invention the adaption of the CT imaging process comprises an afterwards breathing phase correlated 4D-CT reconstruction of a 4D-CT image of the examination volume based on the determined intrinsic respiratory surrogate. As above-mentioned, a 4D-CT image is defined as a sequence of a plurality of 3D-CT images, for example assigned to different breathing phases. Advantageously, the information of the individual breathing behaviour of a patient can be used not only as real time information for a dynamic adaption of the scan process during the actual scan process, but also as information for the steps after having finished the scan process like the reconstruction of image data. Hence, the image quality of the 4D-CT image is improved compared to a reconstruction without a respiratory surrogate.

In a further variant of the method according to one or more example embodiments of the present invention, the reconstruction of the 3D-CT images of the subsequent stacks is performed non-phase correlated. Advantageously, due to the near motionlessness of the subsequent stacks during acquisition of raw data therefrom, phase related information at the stage of the acquisition of raw data is not necessary.

In a further variant of the method according to one or more example embodiments of the present invention, the determination of the intrinsic respiratory surrogate based on the respiratory movement of the segmented portion, preferably the segmented organ, comprises determining at least one of the following information:
which organ is segmented,
in which direction the organ moves,
displacement of the organ,
whether or not raw data of a complete respiratory cycle has been acquired.

The above-mentioned information can be used for determining an intrinsic respiratory surrogate based on the segmented portion.

For realizing the real time reconstruction of fixed image data for the intrinsic respiratory surrogate, the time to determine a respiratory phase of a 3D-CT volume, which is the time for determining the intrinsic respiratory surrogate in one single stack of the examination volume, has to be smaller than a time interval of a breathing cycle. Preferably, the time to determine a respiratory phase of a 3D-CT volume is at least one magnitude, i.e. ten times smaller than the time interval of the corresponding breathing cycle. Advantageously, the reconstructed partial 3D-CT images of the subsequent stacks are reconstructed as quasi-fixed images such that an observance of the breathing movement is not required for an exact reconstruction of the subsequent stacks.

Preferably, the time to determine a respiratory phase of a 3D-CT volume is reduced by reducing the reconstruction time Trecon for reconstructing a 3D-CT image of one single stack of the examination volume. The time Tph to determine a respiratory phase of a 3D-CT volume is as follows:

$$Tph = Trot/2 + Trecon + Tautoseg, \quad (1)$$

wherein Trot is the rotation time of the detector and x-ray source of the CT system.

For reducing the reconstruction time Trecon the reconstruction can be implemented with a coarser pattern. For example, the matrix of reconstruction can be reduced.

Also preferred, the reduction of the reconstruction time Trecon comprises reduction measurements of switching off time consuming optimization algorithms for the reconstruction. For example, time consuming processes are iterative reconstructions or beam hardening corrections. Since the reconstruction of the images of the intrinsic breathing movement can be rough, a fine reconstruction at the first stage is not really necessary. The reduction of the reconstruction time enables to increase the phase-resolution of the reconstruction and enables to reduce artefacts caused by respiratory movement of a patient.

For achieving more precise results, after the 4D-CT reconstruction of a 4D-CT image of the examination volume, a final computation of the intrinsic respiratory surrogate can be additionally performed based on the reconstructed examination volume and the segmented portion, for example a segmented organ.

For achieving a complete set of raw data for each phase of breathing at each z-position, for every z-position, raw data of a complete breathing cycle are recorded. As mentioned-above, the knowledge of the respiratory movement of the patient for the whole breathing cycle of respiratory movement can be used for assigning raw data to the correct phase for an afterwards 4D-CT phase-correlated reconstruction.

In an alternative variant, during the acquisition of raw data, it is detected if the patient holds his breath properly based on the detected intrinsic respiratory surrogate, and in case the patient does not hold his breath properly,
a command is played to remind and motivate the patient to further hold the breath, and/or
the scan process is dynamically reparametrized.

Advantageously, the behaviour of the patient or the control of the scan process can be adapted in real time during a scan process.

Preferably, the breathing phase correlated 4D-CT reconstruction of the examination volume is performed by sorting the 3D-CT images of the reconstructed subsequent stacks of the examination volume according to the computed intrinsic respiratory surrogate. If the resolution of the quite roughly reconstructed 3D-CT images is high enough for the present medical application, the 3D-CT images can be used as sequence of 3D-CT images, i.e. as a 4D-CT image. Advantageously, no additional reconstruction has to be carried out for achieving the breathing phase correlated 4D-CT reconstruction. Just a step of sorting the reconstructed 3D-CT images of subsequent stacks generated for determining the intrinsic respiratory surrogate has to be done such that the extent for generating the 4D-CT image can be reduced to a minimum.

Alternatively, the breathing phase correlated 4D-CT reconstruction of the examination volume is performed by using the segmentation results as 4D-CT-image results. That means that the 4D-CT image, i.e. a sequence of 3D-CT images, is generated by sorting the images of segmented portions, for example organs, according to the computed respiratory surrogate. Also for this variant, an afterwards reconstruction for the 4D-CT image can be dismissed. In other words, in this variant, the real-time auto-segmentation results can be reused in the same way as the real time 3D-CT images can be reused as final reconstructions. Also that alternative is appropriate in case the demands on resolution of the 4D-image sequence are not so high.

In a further variant, during the pre-scan phase an adaption can be realized by training the patient to breathing optimally for a given scan mode or task by taking into account the patients individual breathing behaviour for the given scan mode or task based on the determined intrinsic respiratory surrogate. Advantageously the recorded breathing behaviour of a patient can be used as feedback information for a feedback loop for training the patient for an individual scan mode or task.

Then, after completing the training phase, during the scan phase, it is determined if the patient holds his breath properly based on the intrinsic respiratory surrogate, and in case the patient does not hold his breath properly, a command is played to remind and motivate the patient to further hold the breath. Advantageously, a feedback of the behaviour of the patient can be used to try to influence the breathing behaviour of the patient in real time to save a current scan operation in case the patient does not exactly follow the breathing commands. Further, the scan process can also be dynamically reparametrized, for example by increasing the pitch based on the determined intrinsic respiratory surrogate if the patient seems to be not able to hold the breath properly. In that case, in particular if the patient does not improve his breathing behaviour, although he has been admonished to do so, the scan process can be altered such that the speed of recordation of raw data is increased such that the shortened breath-hold time of the patient can be tolerated.

In a further variant of the method, according to one or more example embodiments of the present invention, during the scan phase, the scan process is aborted in an early stage if it is detected based on the recorded breathing behaviour derived from the intrinsic respiratory surrogate that the scan results are likely insufficient and a rescan cannot be avoided. Advantageously, scan resources and time resources can be saved if it is very likely that a current scan process would lead to a medical image with insufficient image quality.

Further, during the scan phase, it can be detected if the patient holds his breath properly based on the intrinsic respiratory surrogate. In case the patient does not hold his breath properly, the scan process can be stopped and a pause of the scan process can be carried out at a relevant z-position, where the patient is allowed to stop holding the breath. In that case, after the pause, the patient is instructed to perform breath-hold again and the scan process is continued at the z-position, where the scan process was stopped or at a position, where the patient still hold his breath properly. Advantageously, a current scan process can be saved although the patient is transiently not able to follow the breathing commands of the medical imaging system properly.

In a further variant of the method, according to one or more example embodiments of the present invention, in the after-scan phase the individual breathing behaviour is analysed based on a recorded breathing curve derived from the intrinsic respiratory surrogate. In case it is detected that the patient did not follow the breathing commands properly during the scan phase, a re-scan is recommended if severe artifacts are expected. Advantageously, the decision if the scan has to be repeated or not can be automatically carried out based on the feedback information about the patient's breathing behaviour. In that case, a reconstruction based on deteriorated raw data can be dismissed and hence, time resources and medical examination capacities can be saved.

Furthermore, in a variant of the method, according to one or more example embodiments of the present invention, it is automatically determined based on the recorded breathing behaviour how to adapt the medical imaging process. That means that it is decided which measurement or which combination of the above-mentioned measurements for an improvement of the scan process is carried out based on the information of the intrinsic respiratory surrogate. The analysis for that decision can be implemented using classical signal processing approaches or via deep learning-based algorithms. For example, the analysis of the respiratory curve can be done by some kind of artificial neural network.

BRIEF DESCRIPTION OF THE DRAWINGS

The present invention is explained below with reference to the figures enclosed once again. The same components are provided with identical reference numbers in the various figures.

The figures are usually not to scale.

FIG. 1 shows a flow chart diagram illustrating the method for performing a CT imaging process depending on an individual respiration behaviour of a patient according to an embodiment of the present invention, FIG. 2 shows a schematic view on a patient with an inner organ moving due to a respiration movement of the patient, FIG. 5 shows a flow chart diagram illustrating the method for performing a CT imaging process depending on an individual respiration behaviour of a patient according to a third embodiment of the present invention, FIG. 6 shows a flow chart diagram illustrating the method for performing a CT imaging process depending on an individual respiration behaviour of a patient according to a fourth embodiment of the present invention, FIG. 7 shows a schematic view on an adaption device according to an embodiment of the present invention.

DETAILED DESCRIPTION

Figure 8:
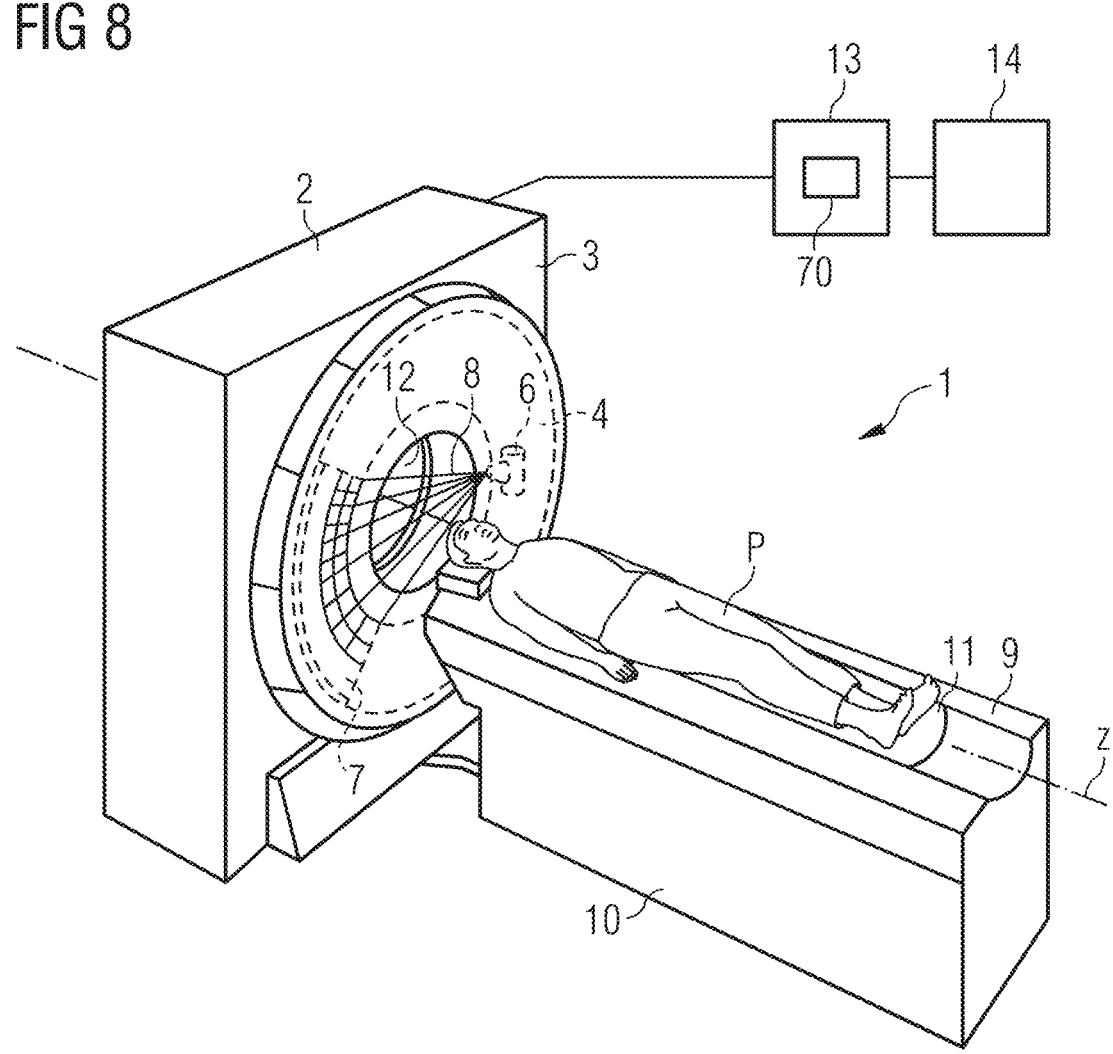
FIG. 8 shows a CT system according to an embodiment of the present invention comprising the adaption device shown in FIG. 7.

FIG. 1 shows a flow chart diagram 100, which illustrates the method for performing a CT imaging process depending on an individual respiration behaviour of a patient P. In step 1.I, CT raw data RD are acquired from an examination volume of a patient. When a computer tomography system is in operation, an X-ray source emits X-rays in the direction of an X-ray detector, wherein the X-rays penetrate the patient and are transmitted by the X-ray detector in the form of raw data RD or measurement signals recorded. During the acquisition, the combination of X-ray source and X-ray detector moves around the z-axis of the CT system in a spiral manner (as shown in FIG. 8) and acquires the raw data from all radial directions.

In step 1.II, subsequent stacks STi of the examination volume V, which are positioned at different z-positions are reconstructed in real time and timely parallel to the acquisition of raw data RD in temporal increments TPH. Hence, during the acquisition of raw data RD, a rough reconstruction of subsequent stacks STi of the examination volume V is performed. These stacks STi can be partial volumes of the examination volume V and may include an organ L to be examined or an additional organ, which are moved correlated to a breathing movement of the patient P. The temporal increments TPH are very small compared to a time interval of a breathing cycle Tbr of the patient P such that an image of a single stack STi can be regarded as a fixed-image and is assigned to a particular phase of the breathing movement of the patient P.

In step 1.III, an automatic organ segmentation is performed based on the subsequent reconstructed stacks STi. For example, a region of an organ L is segmented, wherein the organ L is moved by the breathing movement of the patient.

Hence, in step 1.IV, a respiratory movement of the segmented organ L is detected and determined as the intrinsic respiratory surrogate IRS based on the movement of the detected and segmented organ L.

In step 1.V, the whole examination volume V is reconstructed, wherein a breathing phase correlated 4D-CT reconstruction 4D-CT-R of the examination volume V is performed by sorting reconstructed stacks STi of the examination volume V according to the computed respiratory surrogate IRS. That means that partial images of stacks STi belonging to the same breathing phase are combined to a final 3D-CT image and a sequence of phase-correlated 3D-CT images is achieved, which forms a 4D-CT image, i.e. a sequence of 3D-CT images.

FIG. 2 shows a schematic top view 20 on a patient P with an inner organ L moving due to a respiration movement of the patient P. In FIG. 2, a liver L in the abdomen portion of the patient P is shown. The liver L is shown for two different breathing phases, once with continuous lines and once with dashed lines. It can be taken from FIG. 2 that the liver L moves between these two breathing phases in the moving direction D and a displacement of the liver L, represented by the displacement of the centerpoint PL is illustrated.

Figure 3:
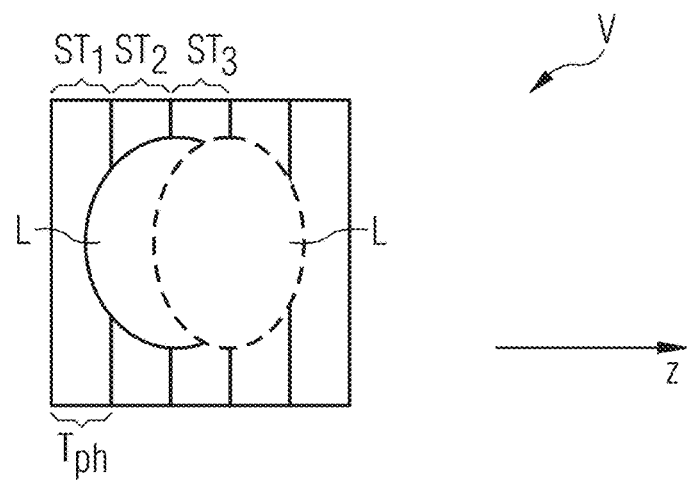
FIG. 3 shows a schematic view on a plurality of stacks with an inner organ included by an imaging volume.

In FIG. 3, a schematic view of a plurality of stacks STi (i=1, 2, 3) included by an examination volume V with an inner organ L is illustrated. Each single stack includes a part of the moving inner organ L. Since the inner organ L moves slowly, movement of the inner organ L during a short time Tph which is necessary for acquiring, reconstructing and segmenting a single stack STi can be neglected. In FIG. 3, the examination volume V is divided into 5 stacks with assigned 5 fixed 3D-CT images of a partial volume of the examination volume V. Each single stack STi can be segmented by an auto-segmentation process such that the part of the inner organ L which is located in the respective stack STi is localized and detected. Based on the 5 3D-CT images of a partial volume for different respiratory phases, a movement and position of the inner organ L during different points of time in different time intervals Tph of a breathing cycle Tbr can be determined.

Figure 4:
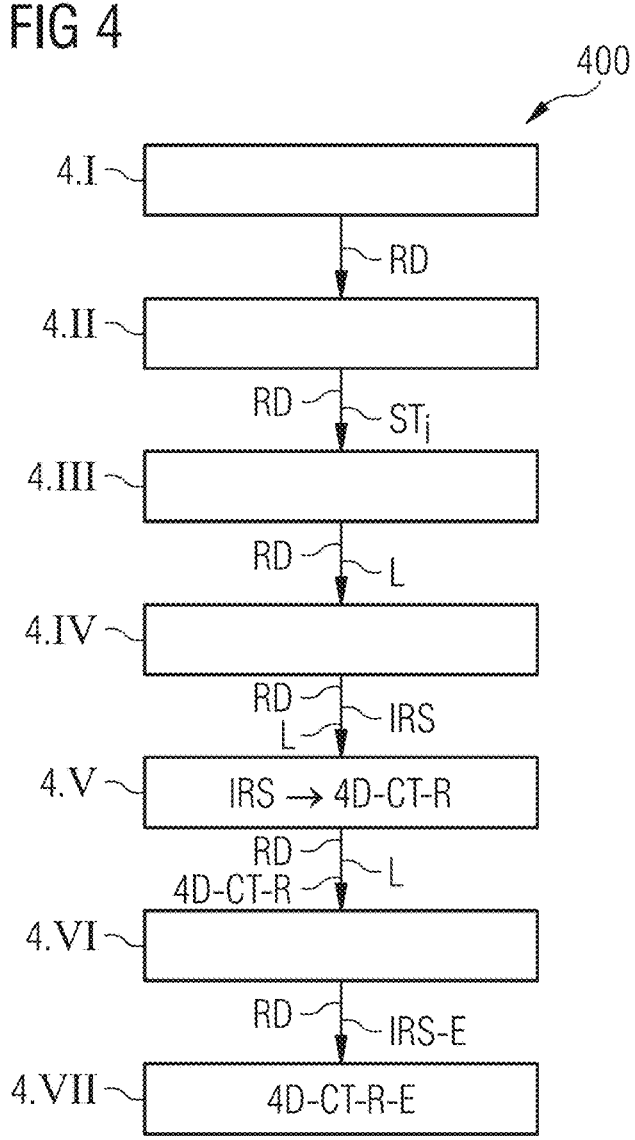
FIG. 4 shows a flow chart diagram illustrating the method for performing a CT imaging process depending on an individual respiration behaviour of a patient according to a second embodiment of the present invention.

In FIG. 4, a flow chart diagram 400 illustrating the Method for performing a CT imaging process depending on an individual respiration behaviour of a patient according to a second embodiment of the present invention is shown. The steps 4.I to 4.V correspond to the steps 1.I to 1.V in FIG. 1 and are therefore not described again. In step 4.VI, a more exact reconstruction of the 3D-CT volumes of the stacks STi of an examination volume V forming the intrinsic respiratory surrogate IRS is performed based on the knowledge of the relation between the raw data RD assigned to different stacks STi of the examination volume V and the different phases of a breathing cycle such that an enhanced intrinsic respiratory surrogate IRS-E is achieved. For example a portion or the whole 4D-CT image 4D-CT-R can be used to determine the enhanced intrinsic respiratory surrogate IRS-E. After that, in step 4.VII, an enhanced 4D-CT image 4D-CT-R-E with higher image quality compared to the image sequence 4D-CT-R reconstructed in step 4.V is reconstructed based on the acquired raw data RD and the enhanced intrinsic respiratory surrogate IRS-E.

In FIG. 5, a flow chart diagram 500 illustrating the Method for performing a CT imaging process depending on an individual respiration behaviour of a patient according to a third embodiment of the present invention, is depicted.

Steps 5.I to 5.IV correspond to the steps 1.I to 1.IV and are not repeatedly described herein. In step 5.V, based on the detection of the intrinsic respiratory surrogate IRS, it is determined if the patient P holds his breath properly HBP. In case the patient follows some predetermined commands correctly, which is symbolized with "y" in FIG. 5, the process continues with step 5.VI, wherein a breathing phase correlated 4D-CT reconstruction 4D-CT-R of the examination volume V based on the determined intrinsic respiratory surrogate IRS is performed. In case the patient P does not hold his breath properly, which is symbolized in FIG. 5 with "n", then in step 5.VII, a command RI is played to remind and motivate the patient P to further hold the breath. Alternatively or additionally the scan process is dynamically reparametrized such that the scan process is adapted to the detected breathing movement of the patient. Hence, in the third embodiment, the intrinsic breathing surrogate IRS is additionally used for controlling a predetermined breathing behaviour of the patient P.

In FIG. 6, a flow chart diagram 600 illustrating the Method for performing a CT imaging process depending on an individual respiration behaviour of a patient according to a fourth embodiment of the present invention is depicted. Steps 6.I to 6.IV correspond to the steps 1.I to 1.IV and are not repeatedly described herein. In step 6.V, the breathing phase correlated 4D-CT reconstruction 4D-CT-R(L) of the examination volume V is performed by sorting the volumes of the segmented organ L according to the computed respiratory surrogate IRS. That means that an additional reconstruction of the 4D-CT image directly based on the acquired raw data RD is omitted. Instead, the final image sequence, i.e. the 4D-CT image, is achieved by a sorted combination of volumes, which are the segmented 3D-CT-images of the stacks STi, i.e. the segmented organ L, wherein the sortation and combination is performed based on the knowledge of the intrinsic breathing surrogate IRS.

In FIG. 7, an adaption device according to an embodiment of the present invention in form of a reconstruction device 70 is schematically illustrated. The reconstruction device 70 comprises an acquisition unit 71 for acquiring CT raw data RD from an examination volume V of a patient P. The acquired raw data RD are transmitted to a first reconstruction unit 72 for reconstructing subsequent stacks STi of the examination volume V at different z-positions in real time and timely parallel to the acquisition of raw data in temporal increments. The reconstructed rough image data of the subsequent stacks STi are transmitted to a segmentation unit 73 for performing an automatic organ segmentation based on the reconstructed rough image data of the subsequent reconstructed stacks STi. Then data of the segmented organ L are transmitted to a surrogate determination unit 74, which is arranged to determine the respiratory movement of the segmented organ L as the intrinsic respiratory surrogate IRS. After completion of the acquisition, the completed intrinsic respiratory surrogate IRS is transmitted to an adaption unit which is implemented in this embodiment as a second reconstruction unit 75. The second reconstruction unit 75 is arranged to reconstruct a sequence of so-called 4D-CT image data 4D-CT-R in conformity with the determined intrinsic respiratory surrogate ISR.

FIG. 8 shows a schematic representation of a computer tomography system 1 comprising a reconstruction device 70 according to an embodiment of the present invention as discussed in detail in context with FIG. 7. The arrangement comprises a gantry also called as scan unit 2 with a stationary part 3, also referred to as a gantry frame, and with a part 4 which can be rotated about a system axis, also referred to as a rotor or drum. The rotating part 4 has an imaging system (X-ray system) which comprises an X-ray source 6 and an X-ray detector 7 which are arranged on the rotating part 4 opposite one another. When the computer tomography system 1 is in operation, the X-ray source 6 emits X-rays 8 in the direction of the X-ray detector 7, penetrates a measurement object P, for example a patient P, and the result is transmitted by the X-ray detector 7 in the form of measurement data or measurement signals recorded.

In FIG. 8, a patient table 9 for positioning the patient P can also be seen. The patient table 9 comprises a bed base 10, on which a patient support plate 11, which is provided for actually positioning the patient P, is arranged. The patient support plate 11 can be adjusted relative to the bed base 10 in the direction of the system axis z, i.e. in the z direction, so that it enters an opening 12 such that the patient P can be introduced into the opening 12 of the scan unit 2 for recording X-ray projections from the patient P. A computational processing of the X-ray projections recorded with the imaging system or the reconstruction of sectional images, 3D images or a 3D data set based on the measurement data or measurement signals of the X-ray projections is carried out in an image computer 13 of the computed tomography device 1, wherein the sectional images or 3D images can be displayed on a display device 14. The image computer 13 can also be designed as a control unit for controlling an imaging process for controlling the scan unit 2 and in particular the imaging system of the scan unit 2. The image computer 13 also comprises the reconstruction device 70 as it is described in context with FIG. 7.

The above descriptions are merely preferred embodiments of the present disclosure but not intended to limit the present disclosure, and any modifications, equivalent replacements, improvements, etc. made within the spirit and principle of the present disclosure should be included within the scope of protection of the present disclosure.

Further, the use of the undefined article "a" or "one" does not exclude that the referred features can also be present several times. Likewise, the term "unit" or "device" does not exclude that it consists of several components, which may also be spatially distributed.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

In addition, or alternative, to that discussed above, units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code.

Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one example embodiment relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Although the present invention has been shown and described with respect to certain example embodiments, equivalents and modifications will occur to others skilled in the art upon the reading and understanding of the specification. The present invention includes all such equivalents and modifications and is limited only by the scope of the appended claims.

What is claimed is:

1. A method for performing a Computed Tomography (CT) imaging process based on individual respiration behaviour of a patient, the method comprising:
    recording a respiratory movement of a patient by monitoring an intrinsic respiratory surrogate of the patient, the recording including
        acquiring CT raw data from an examination volume of the patient,
        reconstructing 3D-CT images of stacks of the examination volume at different z-positions based on the CT raw data,
        performing an automatic segmentation based on the 3D-CT images, at least a portion of the examination volume being segmented by the automatic segmentation,
        determining a respiratory movement of at least the portion of the examination volume as the intrinsic respiratory surrogate; and
    adapting a CT imaging process based on the intrinsic respiratory surrogate, the adapting including performing a first operation in response to detecting a breath of the patient has not been held according to a first command, and the detecting being based on the intrinsic respiratory surrogate.

2. The method according to claim 1, wherein the reconstructing of the 3D-CT images is performed in real time and in parallel with the acquiring of the CT raw data in temporal increments.

3. The method according to claim 2, wherein
a single temporal increment among the temporal increments is smaller than a time interval of a breathing cycle; and
the method further comprises determining a respiratory phase of a first 3D-CT image during a time interval of the single temporal increment, the first 3D-CT image being among the 3D-CT images.

4. The method according to claim 2, wherein the adapting of the CT imaging process includes an afterwards breathing phase-correlated 4D-CT reconstruction of a 4D-CT image of the examination volume based on the intrinsic respiratory surrogate.

5. The method according to claim 1, wherein the at least the portion of the examination volume includes an organ.

6. The method according to claim 5, wherein the determining of the respiratory movement as the intrinsic respiratory surrogate comprises:
determining at least one of
the organ,
a direction in which the organ moves,
an amount of displacement of the organ, or
whether or not the CT raw data corresponds to a complete respiratory cycle.

7. The method according to claim 6, wherein
a single temporal increment is smaller than a time interval of a breathing cycle; and
the method further comprises determining a respiratory phase of a first 3D-CT image during a time interval of the single temporal increment, the first 3D-CT image being among the 3D-CT images.

8. The method according to claim 1, wherein the adapting of the CT imaging process includes an afterwards breathing phase-correlated 4D-CT reconstruction of a 4D-CT image of the examination volume based on the intrinsic respiratory surrogate.

9. The method according to claim 8, further comprising:
performing an additional computation of the intrinsic respiratory surrogate based on the 4D-CT image and the at least the portion of the examination volume.

10. The method according to claim 8, wherein the afterwards breathing phase-correlated 4D-CT reconstruction comprises:
sorting the 3D-CT images according to the intrinsic respiratory surrogate.

11. The method according to claim 8, wherein the determining of the respiratory movement as the intrinsic respiratory surrogate comprises:
determining at least one of
an organ that is segmented,
a direction in which the organ moves,
an amount of displacement of the organ, or
whether or not the CT raw data corresponds to a complete respiratory cycle.

12. The method according to claim 8, wherein
a single temporal increment is smaller than a time interval of a breathing cycle; and
the method further comprises determining a respiratory phase of a first 3D-CT image during a time interval of single temporal increment, the first 3D-CT image being among the 3D-CT images.

13. The method according to claim 8, wherein the reconstructing, performing and determining are performed in real time during the CT imaging process.

14. The method according to claim 1, further comprising:
determining a respiratory phase of a first 3D-CT image during a time interval, the first 3D-CT image being among the 3D-CT images; and
reducing the time interval by reducing a reconstruction time for reconstructing the first 3D-CT image.

15. The method according to claim 14, wherein the reducing of the reconstruction time comprises at least one of:
reducing a matrix size of a reconstruction matrix for the reconstructing of the first 3D-CT image; or
switching off an optimization algorithm for the reconstructing of the first 3D-CT image.

16. The method according to claim 1, wherein CT raw data of a complete breathing cycle are recorded for each z-position among the different z-positions.

17. A non-transitory computer readable medium storing program sections that, when executed by at least one processor at a CT system, cause the CT system to perform the method of claim 1.

18. The method according to claim 1, wherein the first operation comprises:
outputting a second command corresponding to breath holding; or
dynamically reparametrizing the CT imaging process.

19. An adaption device, comprising:
an acquisition unit configured to acquire Computed Tomography (CT) raw data from an examination volume of a patient;
a reconstruction unit configured to reconstruct 3D-CT images of stacks of the examination volume at different z-positions based on the CT raw data;
a segmentation unit configured to perform an automatic segmentation based on the 3D-CT images, at least a portion of the examination volume being segmented by the automatic segmentation;
a surrogate determination unit configured to determine a respiratory movement of at least the portion of the examination volume as an intrinsic respiratory surrogate of the patient; and
an adaption unit configured to adapt a CT imaging process based on the intrinsic respiratory surrogate, the adaption including performing a first operation in response to detecting a breath of the patient has not been held according to a first command, and the detecting being based on the intrinsic respiratory surrogate.

20. A CT system, comprising:
a scan unit configured to perform CT imaging of a patient; and
the adaption device according to claim 19, wherein the adaption device is configured to adapt the CT imaging to a recorded respiratory movement of the patient.

21. An adaption device, comprising:
processing circuitry configured to cause the adaption device to
reconstruct, at different z-positions, 3D-CT images of stacks of an examination volume of a patient based on CT raw data from the examination volume,
perform an automatic segmentation based on the 3D-CT images, at least a portion of the examination volume being segmented by the automatic segmentation;
determine, as an intrinsic respiratory surrogate of the patient, a respiratory movement of at least the portion of the examination volume; and
adapt a CT imaging process based on the intrinsic respiratory surrogate of the patient, the adaption including performing a first operation in response to detecting a breath of the patient has not been held according to a first command, and the detecting being based on the intrinsic respiratory surrogate.

\* \* \* \* \*